United States Patent
Heeringa et al.

(10) Patent No.: US 11,407,491 B2
(45) Date of Patent: Aug. 9, 2022

(54) LIFT-SHARING WING WITH ROTATABLE TRAILING EDGE

(71) Applicant: Bell Textron Inc., Fort Worth, TX (US)

(72) Inventors: Tjepke Heeringa, Dallas, TX (US); James Everett Kooiman, Fort Worth, TX (US)

(73) Assignee: Textron Innovations Inc., Fort Worth, TX (US)

( * ) Notice: Subject to any disclaimer, the term of this patent is extended or adjusted under 35 U.S.C. 154(b) by 127 days.

(21) Appl. No.: 16/894,224

(22) Filed: Jun. 5, 2020

(65) Prior Publication Data
US 2021/0380219 A1 Dec. 9, 2021

(51) Int. Cl.
*B64C 3/50* (2006.01)
*B64C 3/28* (2006.01)
*B64C 3/48* (2006.01)
*B64C 27/22* (2006.01)
*B64C 13/28* (2006.01)
*B64C 27/08* (2006.01)
*B64C 13/16* (2006.01)

(52) U.S. Cl.
CPC .................. *B64C 3/50* (2013.01); *B64C 3/28* (2013.01); *B64C 3/48* (2013.01); *B64C 13/16* (2013.01); *B64C 13/28* (2013.01); *B64C 27/08* (2013.01); *B64C 27/22* (2013.01)

(58) Field of Classification Search
CPC .... B64C 3/50; B64C 3/28; B64C 3/48; B64C 13/16; B64C 13/28; B64C 27/08; B64C 27/22; B64C 2003/445; B64C 13/34; B64C 27/26
See application file for complete search history.

(56) References Cited

U.S. PATENT DOCUMENTS

| | | | |
|---|---|---|---|
| 2008/0035798 A1* | 2/2008 | Kothera | B63B 1/248 244/212 |
| 2017/0113793 A1* | 4/2017 | Toulmay | B64C 27/22 |
| 2017/0144775 A1* | 5/2017 | Jezewski | B64C 13/50 |
| 2018/0043985 A1* | 2/2018 | Thompson | B64C 23/072 |
| 2018/0156293 A1* | 6/2018 | Fox | F16F 7/1022 |
| 2019/0084665 A1* | 3/2019 | Bentivoglio | B64C 9/02 |
| 2019/0233085 A1* | 8/2019 | Akel | B64C 9/20 |
| 2019/0315454 A1* | 10/2019 | Fox | B64C 13/34 |

OTHER PUBLICATIONS

Wikipedia, "Douglas A-4 Skyhawk," 30 pages retrieved from the Internet on Feb. 10, 2020, 6:02 PM; https://en.wikipedia.org/wiki/Douglas_A-4_Skyhawk.
Wikipedia, "Messerschmitt Bf 109," 25 pages retrieved from the Internet on Feb. 10, 2020, 6:06 PM; https://en.wikipedia.org/wiki/Messerschmitt_Bf_109.
Wikipedia, "Viscoelasticity," 11 pages retrieved from the Internet on Feb. 10, 2020, 6:15 PM; https://en.wikipedia.org/wiki/Viscoelasticity.

* cited by examiner

*Primary Examiner* — Rodney A Bonnette
(74) *Attorney, Agent, or Firm* — Patent Capital Group

(57) ABSTRACT

One embodiment includes a rotary aircraft, including: a rotary propulsion system; a body; and a pair of wings connected on opposite sides of the body, wherein each of the wings includes a flap rotatably connected to a trailing edge thereof and configured to rotate downward relative to the wing during low speed and stationary flight of the aircraft, and to rotate upward relative to the wing during high-speed flight of the aircraft.

18 Claims, 7 Drawing Sheets

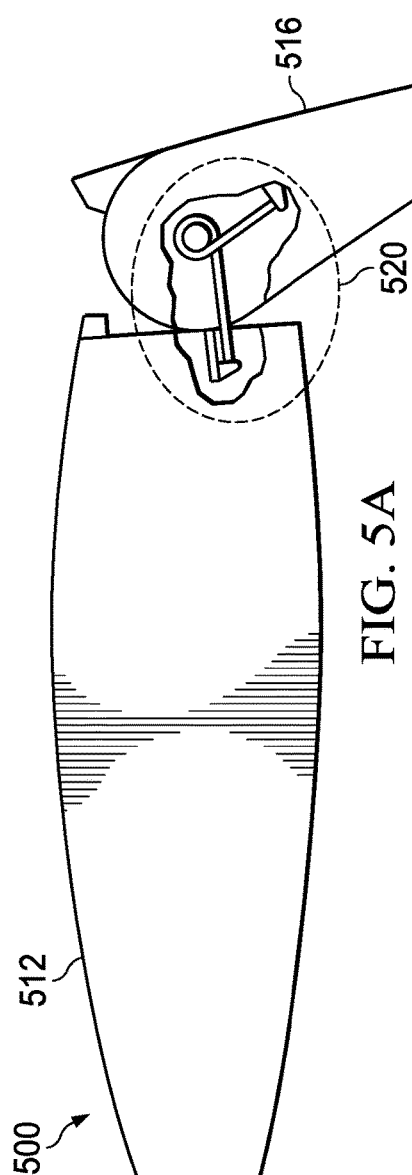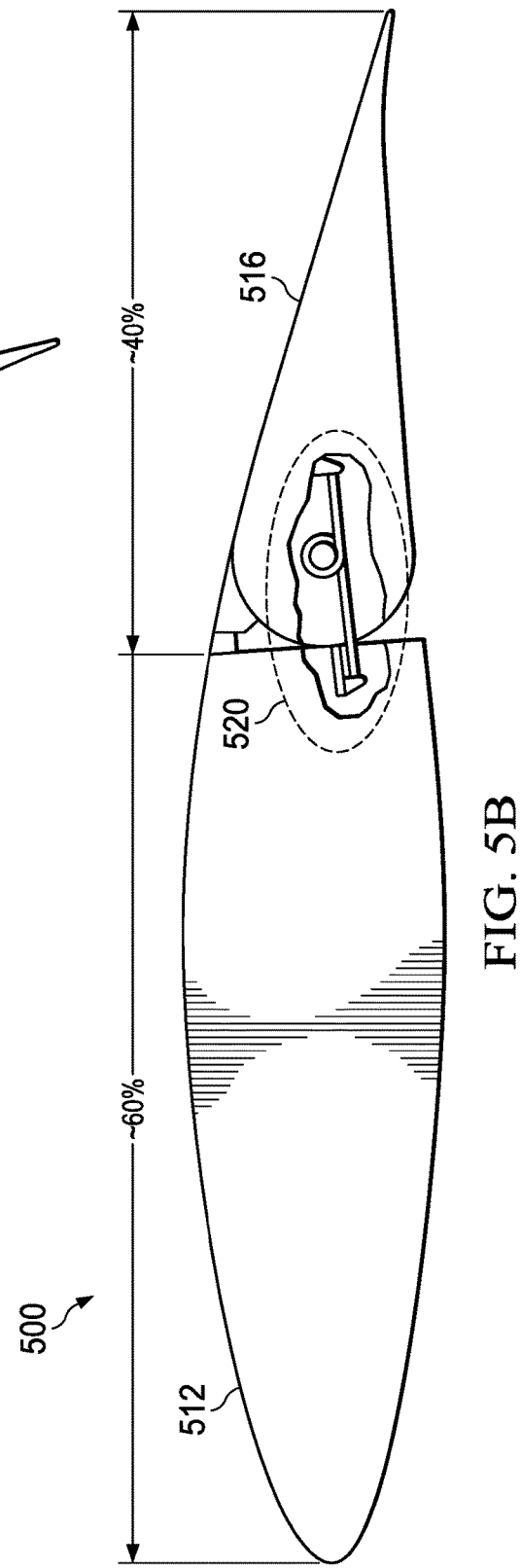

LIFT-SHARING WING WITH ROTATABLE TRAILING EDGE

TECHNICAL FIELD

This disclosure relates in general to aeronautical engineering, and more particularly, though not exclusively, to a system and method for providing a lift-sharing wing with a rotatable trailing edge.

BACKGROUND

Rotary wing aircraft may be used to perform a variety of tasks requiring a high degree of functional flexibility.

SUMMARY

In an example, there is disclosed a rotary aircraft, comprising: a rotary propulsion system; a body; and a pair of wings connected on opposite sides of the body, wherein each of the wings includes a flap rotatably connected to a trailing edge thereof and configured to rotate downward relative to the wing during low speed and stationary flight of the aircraft, and to rotate upward relative to the wing during high-speed flight of the aircraft.

BRIEF DESCRIPTION OF THE DRAWINGS

FIGS. 5A and 5B illustrate an alternative embodiment of a wing.

DETAILED DESCRIPTION

Figure 1:
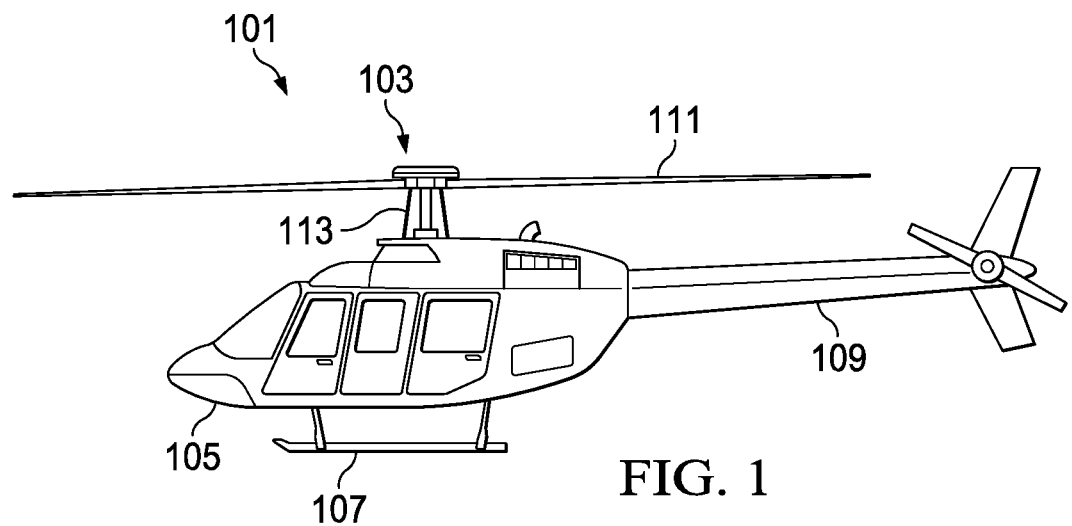
FIGS. 1 and 2 illustrate example aircraft, according to the teachings of the present specification.

Rotary wing aircraft are often called upon to perform multiple functions. For example, in some cases the aircraft are required to lift heavy objects and either hover in place or move at a relatively low rate of speed. On the other hand, they may also be called upon at times to move at a relatively higher rate of speed, particularly when they are not lifting an object, or otherwise engaged in stationary flight operations.

One example of a rotary wing aircraft that may be called upon to perform multiple functions is a military helicopter, such as an attack helicopter. An attack helicopter may be required at times to hover while loitering over a battlefield or providing close air support, and at other times may be required to move at a relatively high rate of speed to respond to a call for close air support.

When a rotary wing aircraft is called upon to move at a relatively higher rate of speed, it is beneficial for that aircraft to have a lift-sharing wing. Lift-sharing wings for forward motion provide similar functionality to the wings of fixed wing aircraft. They share the task of providing lift for the aircraft with the main rotor in forward flight conditions, which allows the rotor to be trimmed to provide more forward thrust and less vertical thrust. This allows the helicopter to fly more efficiently in forward flight and to achieve higher top speeds.

One purpose of a wing mounted to the helicopter is to generate lift in forward flight so the rotor does not have to work as hard. This frees the rotor up for providing more forward thrust and less vertical thrust, while the wing provides the remaining lift required to remain level. This results in a more efficient aircraft in forward flight (better range and endurance) as long as the wing is designed efficiently. It also allows the helicopter to fly faster because the rotor blades at high speed are at a lower angle of attack (less thrust is needed since the wing is helping). This means that the rotor blades on a helicopter with a wing will stall at a higher rate of speed than a helicopter without a wing, which means that a helicopter with a wing can fly faster. This can be important in some applications, such as for example an attack helicopter, which may have higher forward flight airspeed requirements than a traditional commercial helicopter.

While wings are indeed beneficial for forward flight, they can actually inhibit stationary flight operations. When a helicopter is hovering, fixed wings sit in the wash of the rotor blade and provide a download force on the helicopter. The amount of this download force effectively cancels the airlift capability of an equivalent mass. For example, a download force of 100 kg effectively reduces the airlift capacity of a helicopter by 100 kg.

A helicopter or other rotary aircraft may be provided with a hybrid wing that includes both a fixed wing portion, and a rotatable trailing edge that may be biased downward. The rotating trailing edge, when in a downward position, reduces the download force of the wing. This provides increased airlift capacity and increased efficiency when the aircraft is hovering or moving at a low rate of speed. When the aircraft increases its rate of speed, the rotatable trailing edge may move upward, responsive to the airspeed of the aircraft. The rotatable trailing edge may be configured so that when the aircraft is at its maximum airspeed, the trailing edge is at its maximum extension to provide maximum stability for forward flight. When the aircraft is stationary or near-stationary, the trailing edge is in a completely downward or vertical position, thus providing maximum reduction of download force.

Embodiments of the lift-sharing wing described herein, further referred to as just "wing," include passive biasing means that move the trailing edge into a downward/vertical, or nearly downward/vertical, position when hovering or at low speeds. The passive biasing means could include, by way of illustrative and nonlimiting example, a spring, including a leaf spring or a torsion spring, a spring and dashpot mechanism, a rack and pinion mechanism, or other means that may be used to translate the aerodynamic forces on the wing into rotational movement of the trailing edge. In at least some embodiments, the passive biasing means may also include damping means. For example, a dashpot may be used to avoid flutter. Flutter can be problematic if the aircraft encounters any kind of resistance or turbulence, or if its speed changes. This could result in sudden changes in the position of the trailing edge flap, which can affect stability in the aircraft. In addition to the spring and dashpot, a rotary damper could be used, or any other damping means.

In various embodiments, the trailing edge flap that rotates downward according to active or passive biasing means may include only a portion of the overall wing. This portion may be approximately 25%, approximately 40%, or in a range from approximately 15% to approximately 45%. Keeping the rotatable portion of the wing under approximately 45% is advantageous, particularly in cases where passive biasing means are used. If more than approximately 45% of the wing is rotatable, it may be more difficult to control via passive biasing means. In that case, active means may be required to control the wing. While active means are not inconsistent with the teachings of this specification, passive means realize advantages in that they are simpler and have fewer failure modes. This can help to increase the reliability of the aircraft and make maintenance simpler.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIG. 1 illustrates an example embodiment of a rotorcraft 101. Rotary aircraft 101 could be either a manned or an unmanned rotary aircraft. In some cases, rotary aircraft 101 could be electrically powered instead of powered by jet fuel. In those cases, rotary aircraft 101 could either be designed from the start with an in-air recharging system, or it could be modified after production with an aftermarket in-air recharging system.

In cases where rotary aircraft 101 is powered by jet fuel, it could be modified to serve as a tanker for in-air recharging of electrical aircraft such as electrically powered drones. For example, rotary aircraft 101 could include a generator that converts its jet fuel power into electrical power, and that electrical power could be shared with electrical aircraft such as drones.

The illustrated example portrays a side view of rotorcraft 101. Rotorcraft 101 includes a rotor system 103 with a plurality of rotor blades 111 supported by a mast 113. The pitch of each rotor blade 111 can be managed or adjusted in order to selectively control direction, thrust, and lift of rotorcraft 101. Rotorcraft 101 further includes a fuselage 105, landing skids 107, and a tail structure 109. In the illustrated embodiment, tail structure 109 may be used as a horizontal stabilizer. Torque is supplied to rotor system 103 using at least one engine.

In this illustration, rotor blades 111 form a motive subsystem, or in other words, a subsystem that provides the motive force to move the aircraft. The controls that manage or adjust the control direction form a control subsystem, which can include manual user controls, as well as computer augmentation to manual user control. Furthermore, in some embodiments, rotorcraft 101 may be an autonomous drone vehicle, or a remote-controlled drone vehicle, in which case some control functions are provided by a computer.

Figure 2:
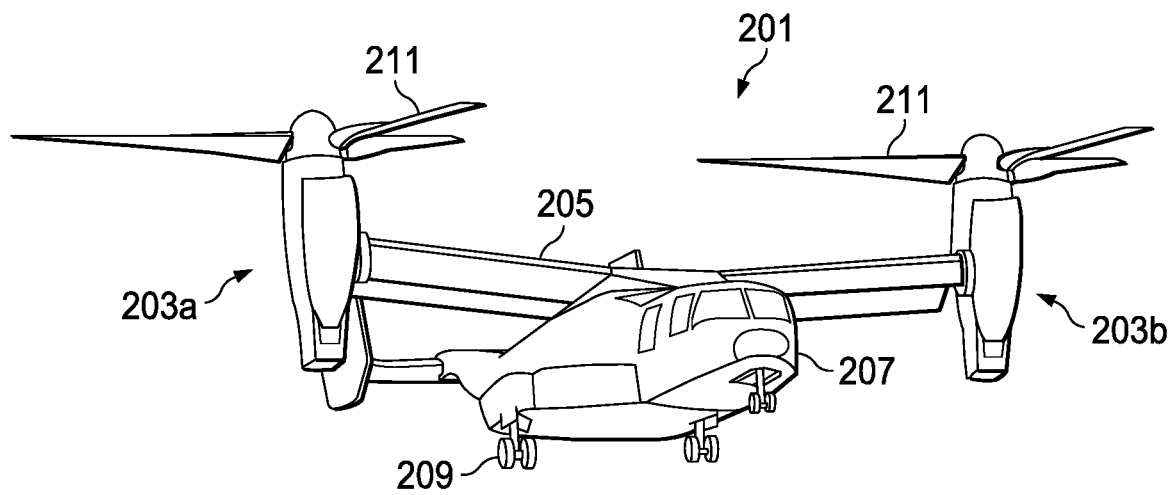

FIG. 2 illustrates a perspective view of an example tiltrotor aircraft 201. Tiltrotor aircraft 201 could be either a manned or an unmanned rotary aircraft. In some cases, tiltrotor aircraft 201 could be electrically powered instead of powered by jet fuel. In those cases, tiltrotor aircraft 201 could either be designed from the start with an in-air recharging system, or it could be modified after production with an aftermarket in-air recharging system.

In cases where tiltrotor aircraft 201 is powered by jet fuel, it could be modified to serve as a tanker for in-air recharging of electrical aircraft such as electrically powered drones. For example, tiltrotor aircraft 201 could include a generator that converts its jet fuel power into electrical power, and that electrical power could be shared with electrical aircraft such as drones.

Tiltrotor aircraft 201 includes nacelles 203a and 203b, a wing 205, landing gear 209, and a fuselage 207. Each nacelle 203a and 203b respectively includes a plurality of rotor blades 211. Moreover, each nacelle 203a and 203b may include an engine and gearbox for driving rotor blades 211. In some embodiments, nacelles 203a and 203b may each be configured to rotate between a helicopter mode, in which the nacelles 203a and 203b are approximately vertical, and an airplane mode, in which the nacelles 203a and 203b are approximately horizontal.

It should be appreciated that rotorcraft 101 of FIG. 1 and tiltrotor aircraft 201 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

In this illustration, rotor blades 211 form a motive subsystem, or in other words, a subsystem that provides the motive force to move the aircraft. The controls that manage or adjust the control direction form a control subsystem, which can include manual user controls, as well as computer augmentation to manual user control. Furthermore, in some embodiments, tiltrotor aircraft 201 may be an autonomous drone vehicle, or a remote-controlled drone vehicle, in which case some control functions are provided by a computer.

Figure 3:
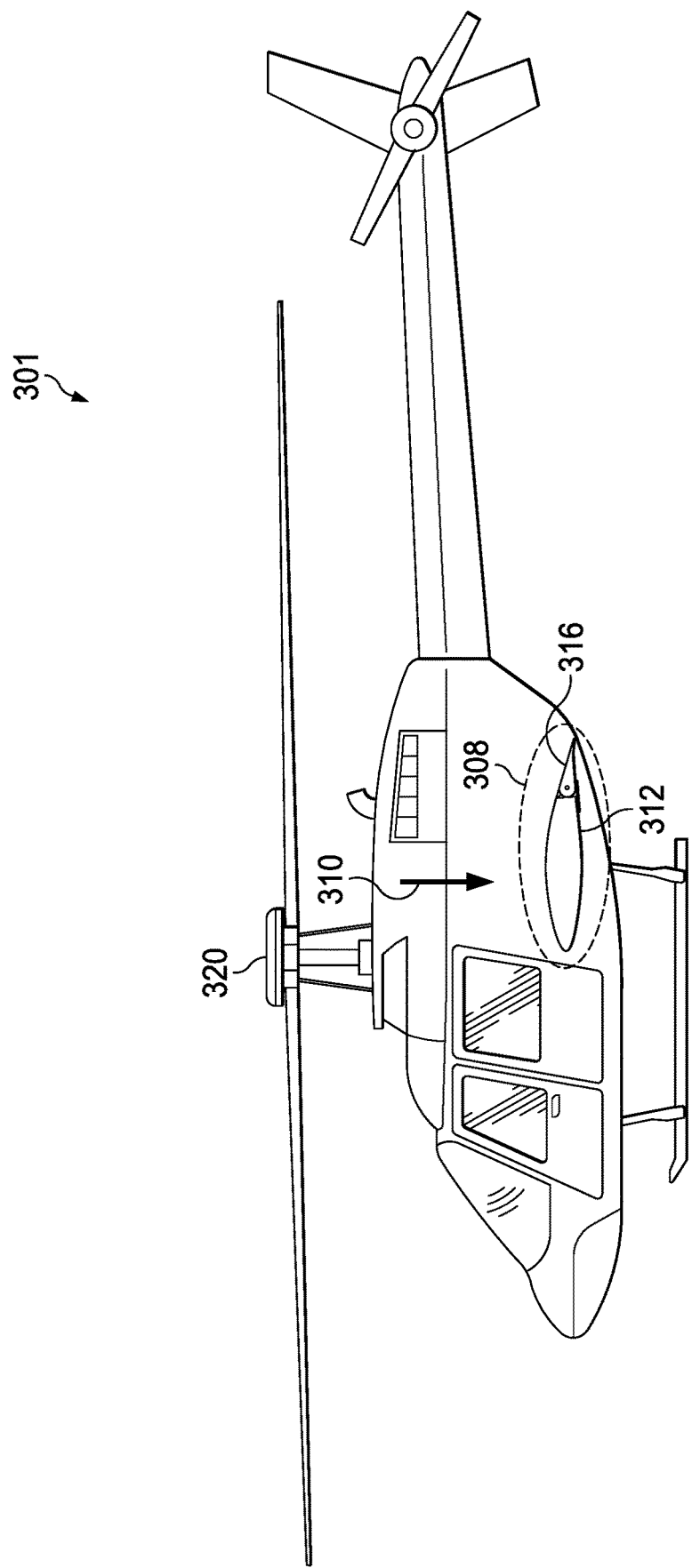
FIG. 3 is a side-view illustration of an aircraft.

FIG. 3 is a side-view illustration of an aircraft 301. Aircraft 301 is distinct from aircraft 101 of FIG. 1 and 201 of FIG. 2, in that aircraft 301 includes a wing 308.

For example, aircraft 301 may have multiple missions and purposes, including some missions that require stationary flight ("hovering"), airlifting of heavy weight, moving at a low rate of speed, and alternatively moving at a high rate of speed. When moving at a high rate of speed, it is relatively desirable to increase the length of wing 308. However, when hovering or moving at a low rate of speed, wing 308 provides a substantial download force 310. This download force decreases the efficiency of rotary drive system 320, and also offsets its payload capacity when providing, for example, airlift services.

In other words, in stationary flight, it is desirable to not have wing 308. However, in forward flight, and particularly in high-speed forward flight, it is desirable and may even be necessary to have wing 308.

As a trade-off that provides reduced download force in stationary flight, but still enables high-speed forward flight, wing 308 includes both a fixed leading edge 312 and a rotating trailing edge flap 316. Rotating trailing edge flap 316 may be biased to rotate downward in stationary or low-speed flight, while it may rotate upward responsive to the aerodynamic forces of forward flight. This provides reduced download force in stationary flight, while providing increased stability for high-speed forward flight.

Figure 4A:
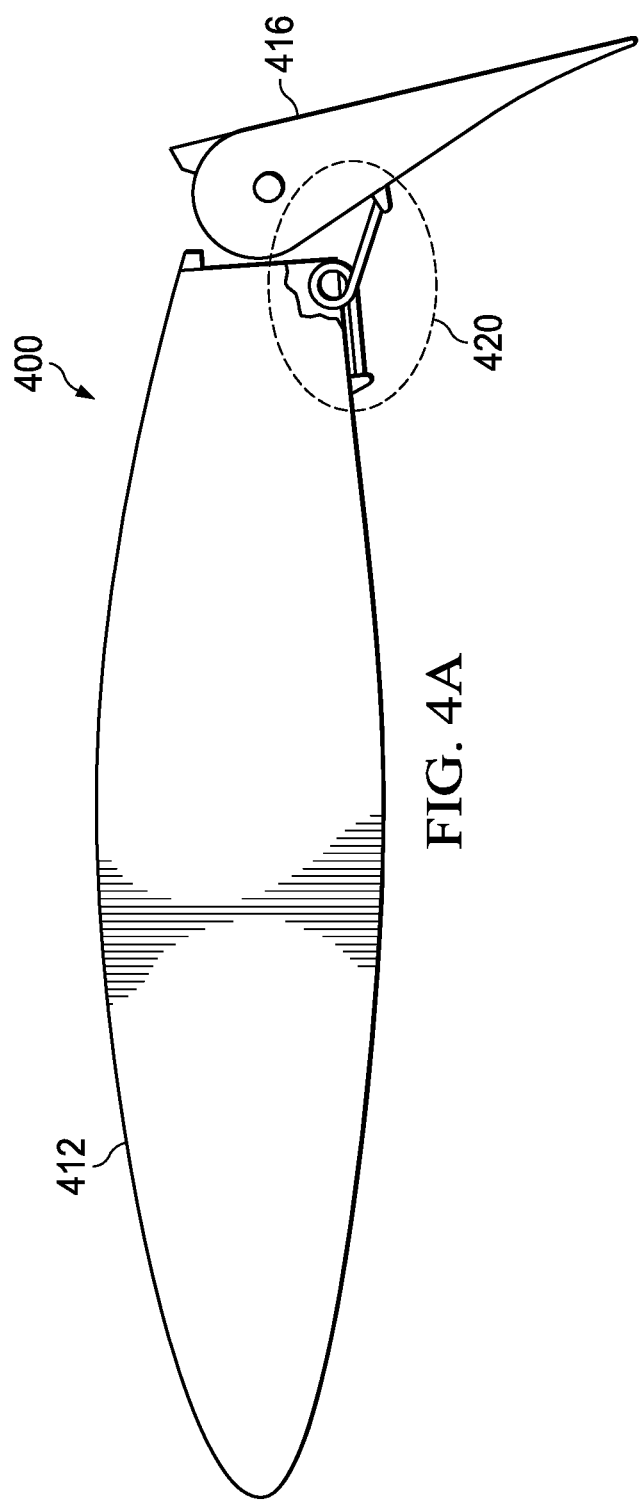
FIGS. 4A and 4B illustrate a more detailed view of a wing for a rotary aircraft.
Figure 4B:
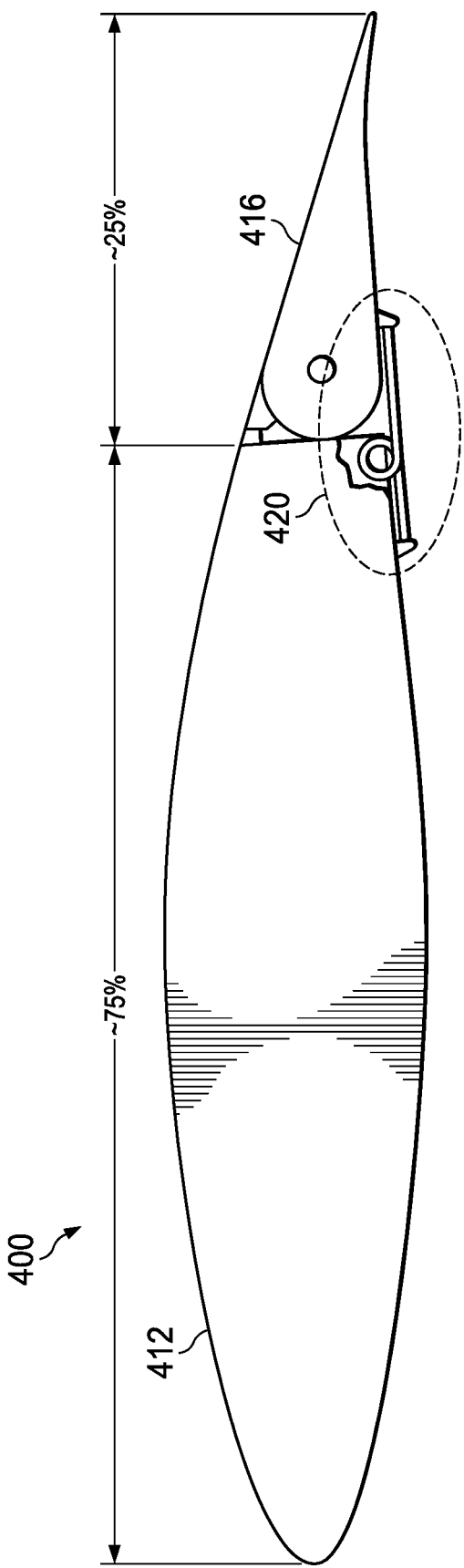

FIGS. 4A and 4B illustrate a more detailed view of a wing 400 for a rotary aircraft. In this case, wing 400 includes a fixed portion 412 that may affix statically to the body of the rotary aircraft. Trailing edge flap 416 is rotatably or hingedly connected to static portion 412. Illustrated in this example is biasing means 420, that biases trailing edge flap 416 into a downward position in the absence of outside forces. Biasing means 420 may have a stiffness selected so that in the presence of aerodynamic forces, such as in high-speed flight, trailing edge flap 416 rotates upward as illustrated in FIG. 4B.

Biasing means 420 may be either active or passive biasing means. In the case of active biasing means, a control system may be necessary to measure the aerodynamic forces or the airspeed, and then provide a feedback control loop or digital control means that actively rotates trailing edge flap 416 according to the detected airspeed or aerodynamic forces. This could be accomplished via pneumatic, hydraulic, or other means.

In the case of passive biasing means, the biasing means could be any form of spring. This can include a leaf spring, a torsion spring, a rotary spring, tension or compression spring, or some other kind of spring. The stiffness of the spring is selected according to the expected aerodynamic forces at a selected rate of speed for the rotary aircraft. Other biasing means are known and may also be used. In some embodiments, the biasing means could include a hinge that is configured to rotate freely under the influence of gravity. In that case, the biasing means may be, or may include, the gravitational torque incident on the trailing edge flap. The biasing means may also include the rotor force incident on trailing edge flap 416, which tends to force trailing edge flap 416 toward a downward position. Design considerations may influence the choice between gravitational biasing or spring (or other) biasing. For example, if it desirable to let trailing edge flap 416 move relatively freely, then gravitational/rotor force biasing means may be sufficient. If it is desirable to more strongly bias trailing edge flap 416 toward the downward position (thus requiring greater force to displace it) then a spring or other stronger biasing means may be used.

In the case of active or passive biasing means, there may also be damping means provided to help ensure that the aircraft does not experience flutter due to turbulence, changes in speed, or other aerodynamic forces. The damping means may be, for example, a dashpot, or other mechanical device that resists displacement acceleration. The damping means may act in one direction or both directions. For example, it may be desirable to permit trailing edge flap to displace quickly and responsively into an upward or horizontal position to aid high-speed flight, but to resist sudden displacement back toward a vertical position in response to small changes in airspeed or other aerodynamic forces. In that case, the damping means may act strictly against downward or vertical movement. Other design considerations could drive a damper to act in the opposite direction, or in both directions.

In the case of wing 400, the trailing edge flap is approximately 25% of the overall length of the wing. The fixed leading-edge portion is approximately 75%.

FIGS. 5A and 5B illustrate an alternative embodiment of a wing 500. As before, FIG. 5A illustrates the wing in a downward-biased position, while FIG. 5B illustrates the wing in an upward position, such as responsive to aerodynamic forces. In this figure, an alternative spring configuration is shown, specifically a compression spring 520 internal to the wing.

In this case, leading edge 512 is a fixed portion, while trailing edge 516 is a rotatable trailing edge flap. In FIG. 5A, trailing edge flap 516 is illustrated in a substantially lowered position, while in FIG. 5B, it is in a substantially extended position.

In this case, an alternative embodiment is shown where the fixed portion is approximately 60% of the overall wing length, while the rotatable trailing edge is approximately 40%.

In other embodiments, the trailing edge may be in the range of approximately 15 to 45% of the overall length of the wing. In general terms, the reduction in download force varies directly with the percentage of the wing that can rotate downward during stationary or near-stationary flight. However, the portion of the wing that rotates downward also varies directly with the force required to move the wing up into the extended position in the presence of aerodynamic forces. Thus, there is a trade-off between optimizing for reduced download forces and optimizing for extensibility of the wing in the presence of aerodynamic forces. The exact portion of the wing that rotates downward may be left as a design consideration for a specific embodiment, in light of the desired reduction in download force, and in light of the desired airspeed capabilities of the rotary aircraft. Furthermore, while FIGS. 4A/4B and 5A/5B show different biasing means with different ratios, these are non-limiting examples. Any of the biasing means disclosed herein can be used in combination with any of the ratios. Specifically, a leaf spring, torsion spring, rotary spring, tension spring, compression spring, rack and pinion, or active biasing means can be used with any selected ratio, such as in the range of 25/75-40/60.

Figure 6A:
FIGS. 6A and 6B illustrate a perspective view of an alternative embodiment of a wing.
Figure 6B:
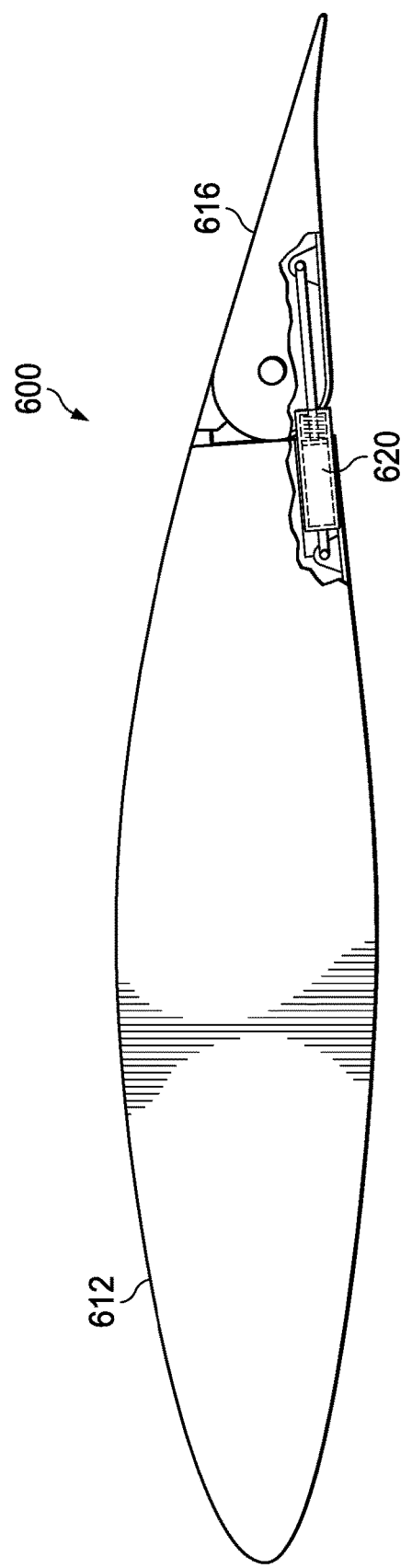

FIGS. 6A and 6B illustrate a perspective view of an alternative embodiment of a wing 600. As before, wing 600 includes a fixed portion 612, and a rotatable portion 616. In this illustration, biasing means include a spring-and-dashpot mechanism 620. This configuration features a spring that provides biasing in a selected direction (either biasing toward the upward position, or toward the downward position, depending on the embodiment). The dashpot provides a damper that resists acceleration, and may be used for example to prevent flutter, as described above.

Figure 7:
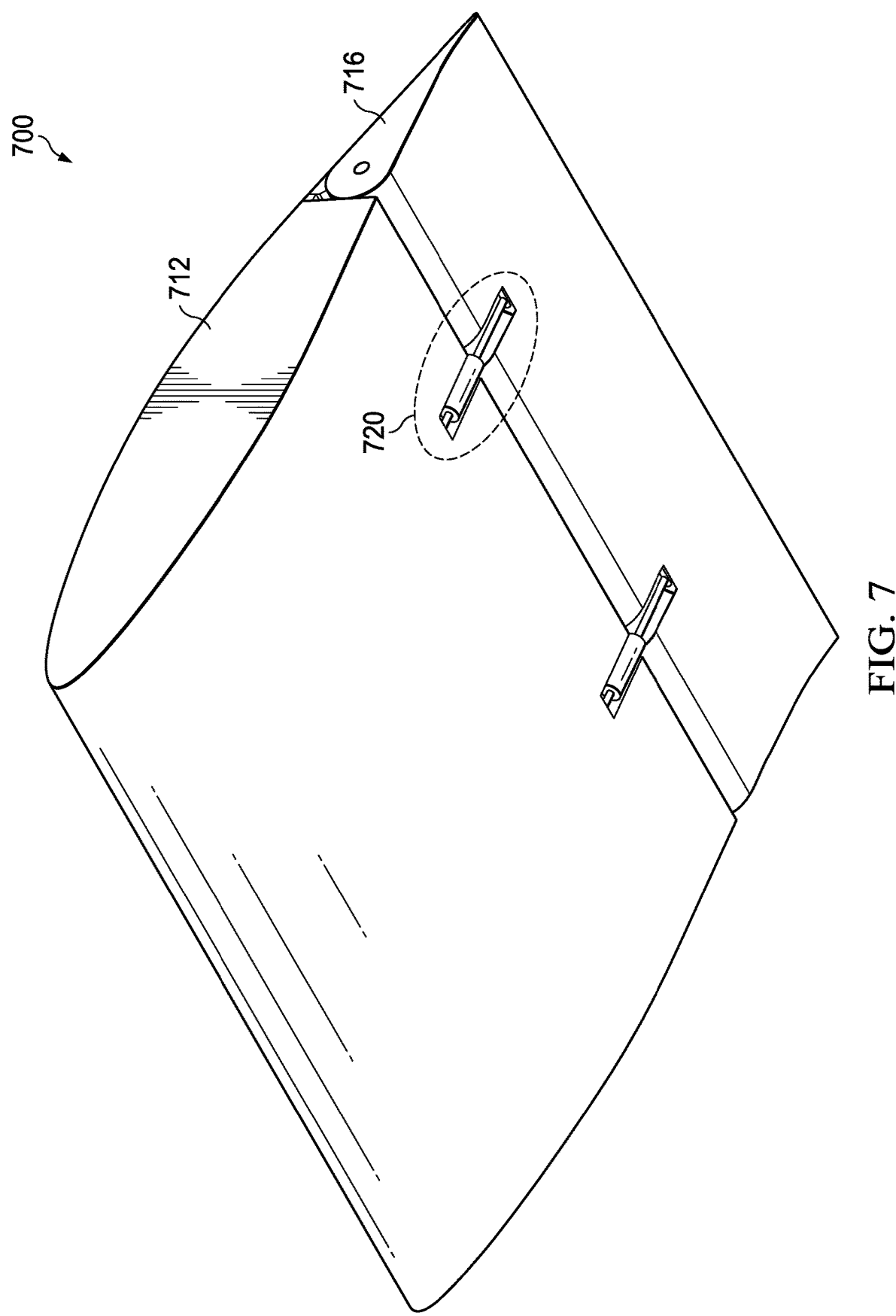
FIG. 7 illustrates yet another embodiment of a wing.

FIG. 7 illustrates yet another embodiment of a wing 700. In this case, wing 700 uses a recessed spring and dashpot configuration 720 between static portion 712 and trailing edge flap 716. One advantage of spring and dashpot configuration 720 is that it inherently provides both the biasing means and the damping means. This means that the spring is biased downward by hydraulic or pneumatic forces and can be extended by aerodynamic forces acting on the spring and dashpot mechanism. If the aerodynamic forces change suddenly, the dashpot acts as a damping means and dampens the speed of motion in a negative feedback configuration. Again, in wing 700, spring and dashpot configuration 720 is recessed to ensure that trailing edge flap 716 can fully extend when necessary.

It is further seen in FIG. 7 that a pair of biasing means may be used on the individual wing to provide greater stability and control. It should be understood that biasing means may be used in pairs in any of the wing configurations illustrated throughout this specification, or in any other suitable number, such as one biasing means, two biasing means, three biasing means, four biasing means, or some other number of biasing means.

Figure 8A:
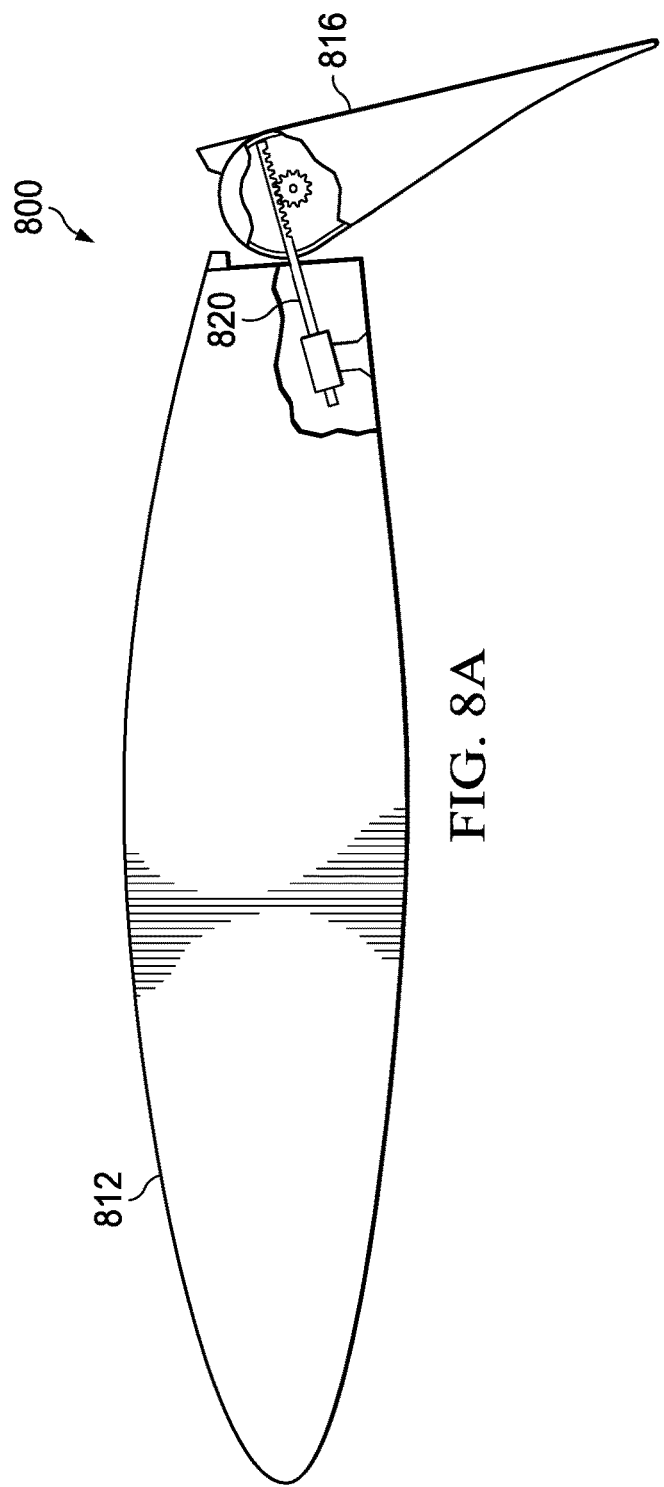
FIGS. 8A and 8B illustrate an alternative embodiment in which the biasing means include a rack and pinion.
Figure 8B:
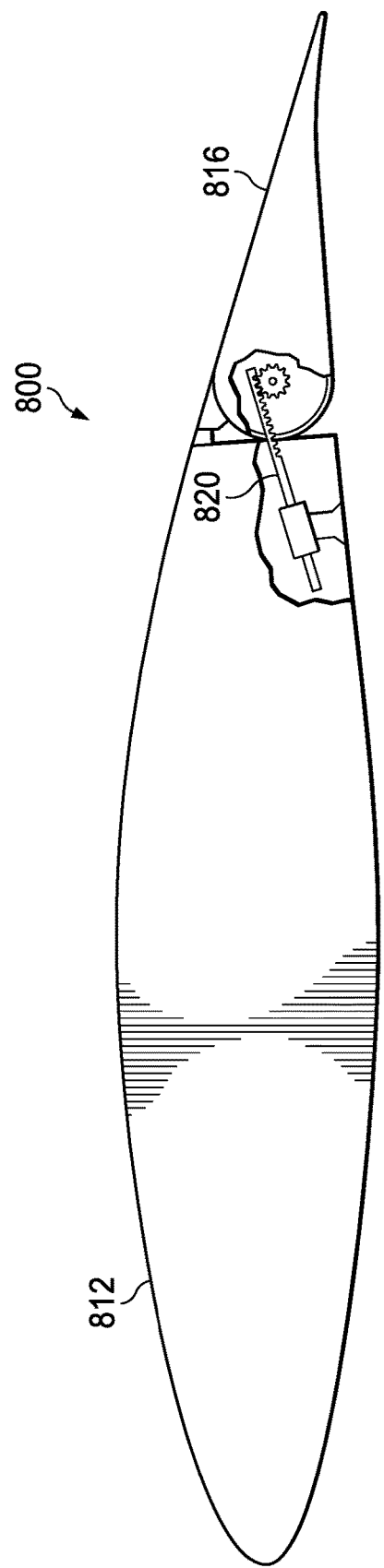

FIGS. 8A and 8B illustrate an alternative embodiment in which the biasing means include a rack and pinion 820. Rack and pinion 820 may be hydraulically or pneumatically biased toward the downward position, or the pinion may include a spring (such as a torsion spring) that biases its motion. In the presence of aerodynamic forces, the pinion may move along the rack and extend trailing edge flap 616 upward. In some cases, rack 824 may engage flap 816 rotationally, so that linear motion of rack 824 is translated to rotation of flap 816.

In addition to passive biasing means, rack and pinion 820 could also include an active control system. For example, a control circuit could be used to measure the airspeed or directly measure aerodynamic forces on the wing, and to electromechanically control rack and pinion 820 responsive to the airspeed.

In this embodiment, rack and pinion 820 is shown in a recessed configuration, which helps to enable full extension of trailing edge flap 816 in the presence of aerodynamic forces.

The diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Embodiments of the teachings of the present specification may include the following nonlimiting examples, substantially as described.

There is disclosed in one example a rotary aircraft, comprising: a rotary propulsion system; a body; and a pair of wings connected on opposite sides of the body, wherein each of the wings includes a flap rotatably connected to a trailing edge thereof and configured to rotate downward relative to the wing during low speed and stationary flight of the aircraft, and to rotate upward relative to the wing during high-speed flight of the aircraft.

There is further disclosed an example rotary aircraft, wherein the flaps are passively biased downward.

There is further disclosed an example rotary aircraft, wherein the flaps are passively biased downward via a leaf spring.

There is further disclosed an example rotary aircraft, wherein the flaps are passively biased downward via a torsion spring.

There is further disclosed an example rotary aircraft, wherein the flaps are biased downward via a rack and pinion.

There is further disclosed an example rotary aircraft, wherein the rack and pinion is passively biased downward.

There is further disclosed an example rotary aircraft, further comprising a controller to actively adjust a rotational position of the flaps relative to the wings according to airspeed.

There is further disclosed an example rotary aircraft, further comprising a control system to actively adjust a rotational position of the flaps relative to the wings according to an airspeed of the aircraft.

There is further disclosed an example rotary aircraft, further comprising a damper to prevent flutter of the flaps relative to the wings.

There is further disclosed an example rotary aircraft, wherein the damper comprises a dashpot.

There is further disclosed an example rotary aircraft, wherein the damper acts only in a downward direction.

There is further disclosed an example rotary aircraft, wherein the damper acts only in the upward direction.

There is further disclosed an example rotary aircraft, wherein the damper acts bi-directionally.

There is further disclosed an example rotary aircraft, wherein the flaps are approximately 25% of the wings' length.

There is further disclosed an example rotary aircraft, wherein the flaps are approximately 40% of the wings' length.

There is further disclosed an example rotary aircraft, wherein the flaps are between approximately 15% and 45% of the wings' length.

There is also disclosed a wing assembly for a rotary aircraft, comprising: a fixed wing portion to rigidly attach to the rotary aircraft; and a trailing edge hingedly connected to the fixed wing portion, wherein the trailing edge is passively biased to a downward position relative to the fixed wing portion and adjustably rotatable relative to the fixed wing portion responsive to aerodynamic forces of flight.

There is further disclosed an example wing assembly, wherein the trailing edge is passively biased downward via a spring.

There is further disclosed an example wing assembly, wherein the wing assembly of claim 17, wherein the trailing edge is biased downward via a passively downward-biased rack and pinion.

There is further disclosed an example wing assembly, further comprising a controller to actively adjust the trailing edge according to airspeed.

There is further disclosed an example wing assembly, further comprising a control system to actively adjust the trailing edge according to airspeed.

There is further disclosed an example wing assembly, further comprising damping means to prevent flutter of the trailing edge relative to the fixed wing portion.

There is further disclosed an example wing assembly, wherein the damping means acts only in the downward direction.

There is further disclosed an example wing assembly, wherein the damping means acts only in the upward direction.

There is further disclosed an example wing assembly, wherein the damping means acts bi-directionally.

There is further disclosed an example wing assembly, wherein the biasing means comprise a dashpot.

There is further disclosed an example wing assembly, wherein a length of the trailing edge is approximately 25% of an overall length of the wing assembly.

There is further disclosed an example wing assembly, wherein a length of the trailing edge is approximately 40% of an overall length of the wing assembly.

There is further disclosed an example wing assembly, wherein a length of the trailing edge is between approximately 15% and 45% of an overall length of the wing assembly.

There is also disclosed an example rotary aircraft comprising a wing, the wing having a forward fixed portion statically affixed to a body of the aircraft, and a trailing edge flap rotatably affixed to a trailing edge of the fixed portion and comprising passive biasing means to bias the trailing edge flap downward relative to the forward fixed portion, the passive biasing means having a stiffness to rotate the trailing edge flap upward relative to the forward fixed portion in the presence of aerodynamic forces of forward flight.

There is further disclosed an example rotary aircraft, wherein the trailing edge is passively biased downward.

There is further disclosed an example rotary aircraft, wherein the trailing edge is passively biased downward relative to the forward fixed portion via a spring and damper.

There is further disclosed an example rotary aircraft, wherein the trailing edge is passively biased downward relative to the forward fixed portion via a leaf spring.

There is further disclosed an example rotary aircraft, wherein the trailing edge is passively biased downward relative to the forward fixed portion via a torsion spring.

There is further disclosed an example rotary aircraft, wherein the trailing edge is passively biased downward relative to the forward fixed portion via a passively downward-biased rack and pinion.

There is further disclosed an example rotary aircraft, wherein the trailing edge further comprises a damper to prevent flutter.

There is further disclosed an example rotary aircraft, wherein the damper acts only in the downward direction.

There is further disclosed an example rotary aircraft, wherein the damper acts only in the upward direction.

There is further disclosed an example rotary aircraft, wherein the damper acts bi-directionally.

There is further disclosed an example rotary aircraft, wherein the trailing edge is biased downward relative to the forward fixed portion via a passively downward-biased spring and dashpot.

There is further disclosed an example rotary aircraft, wherein the trailing edge flap is approximately 25% of the forward fixed portion's length.

There is further disclosed an example rotary aircraft, wherein the trailing edge flap is approximately 40% of the forward fixed portion's length.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment," "example embodiment," "an embodiment," "another embodiment," "certain embodiments," "some embodiments," "various embodiments," "other embodiments," "alternative embodiment," and the like are intended to mean that any such features are included in one or more embodiments of the present disclosure, but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z," "at least one of X, Y or Z," "one or more of X, Y and Z," "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A rotary aircraft, comprising:
   a rotary propulsion system;
   a body; and
   a pair of wings connected on opposite sides of the body, wherein each of the wings includes a flap rotatably connected to a trailing edge thereof and configured to rotate downward relative to the wing during low speed and stationary flight of the aircraft, and to rotate upward relative to the wing during high-speed flight of the aircraft, wherein the flaps are passively biased downward, and comprise a damper configured to act only in a downward direction.

2. The rotary aircraft of claim 1, wherein the flaps are passively biased downward via a leaf spring.

3. The rotary aircraft of claim 1, wherein the flaps are passively biased downward via a torsion spring.

4. The rotary aircraft of claim 1, wherein the flaps are biased downward via a rack and pinion.

5. The rotary aircraft of claim 4, wherein the rack and pinion is passively biased downward.

6. The rotary aircraft of claim 5, further comprising a controller to actively adjust a rotational position of the flaps relative to the wings according to airspeed.

7. The rotary aircraft of claim 1, further comprising a control system to actively adjust a rotational position of the flaps relative to the wings according to an airspeed of the aircraft.

8. The rotary aircraft of claim 2, further comprising a damper to prevent flutter of the flaps relative to the wings.

9. The rotary aircraft of claim 8, wherein the damper comprises a dashpot.

10. A wing assembly for a rotary aircraft, comprising:
    a fixed wing portion to rigidly attach to the rotary aircraft; and
    a trailing edge hingedly connected to the fixed wing portion, wherein the trailing edge is passively biased to a downward position relative to the fixed wing portion and adjustably rotatable relative to the fixed wing portion responsive to aerodynamic forces of flight, and further comprises a damper configured to act only in a downward direction.

11. The wing assembly of claim 10, wherein the trailing edge is passively biased downward via a spring.

12. The wing assembly of claim 10, further comprising damping means to prevent flutter of the trailing edge relative to the fixed wing portion.

13. The wing assembly of claim 10, wherein a length of the trailing edge is 25% of an overall length of the wing assembly.

14. The wing assembly of claim 10, wherein a length of the trailing edge is 40% of an overall length of the wing assembly.

15. The wing assembly of claim 10, wherein a length of the trailing edge is between 15% and 45% of an overall length of the wing assembly.

16. A rotary aircraft comprising a wing, the wing having a forward fixed portion statically affixed to a body of the aircraft, and a trailing edge flap rotatably affixed to a trailing edge of the fixed portion and comprising passive biasing means to bias the trailing edge flap downward relative to the forward fixed portion, the passive biasing means having a stiffness to rotate the trailing edge flap upward relative to the forward fixed portion in the presence of aerodynamic forces of forward flight, and further comprising a damper configured to act only in a downward direction.

17. The rotary aircraft of claim 16, wherein the trailing edge is passively biased downward.

18. The rotary aircraft of claim 16, wherein the trailing edge is passively biased downward relative to the forward fixed portion via a spring and damper.

* * * * *